US012750342B2

(12) United States Patent
Heer et al.

(10) Patent No.: US 12,750,342 B2
(45) Date of Patent: Sep. 29, 2026

(54) CONDITIONAL FILTERING FOR TIME-DETERMINISTIC FIREWALL

(71) Applicants: HIRSCHMANN AUTOMATION AND CONTROL GMBH, Neckartenzlingen (DE); HOCHSCHULE ESSLINGEN, Esslingen (DE)

(72) Inventors: Tobias Heer, Frickenhausen (DE); Lukas Bechtel, Stuttgart (DE)

(73) Assignees: Hirschmann Automation and Control GmbH, Neckartenzlingen (DE); Hochschule Esslingen, Esslingen (DE)

( * ) Notice: Subject to any disclaimer, the term of this patent is extended or adjusted under 35 U.S.C. 154(b) by 42 days.

(21) Appl. No.: 18/833,112

(22) PCT Filed: Feb. 17, 2023

(86) PCT No.: PCT/EP2023/054098
§ 371 (c)(1),
(2) Date: Jul. 25, 2024

(87) PCT Pub. No.: WO2023/156626
PCT Pub. Date: Aug. 24, 2023

(65) Prior Publication Data

US 2025/0158963 A1 May 15, 2025

(30) Foreign Application Priority Data

Feb. 18, 2022 (DE) .................... 10 2022 103 927.7

(51) Int. Cl.
*G06F 21/00* (2013.01)
*H04L 9/40* (2022.01)

(52) U.S. Cl.
CPC ................................ *H04L 63/0263* (2013.01)

(58) Field of Classification Search
CPC ............ H04L 63/0263; H04L 63/1408; H04L 63/0227
See application file for complete search history.

(56) References Cited

U.S. PATENT DOCUMENTS 7,143,438 B1 * 11/2006 Coss .................. H04L 63/0263 709/224
2003/0051165 A1 3/2003 Krishnan et al.
(Continued)

OTHER PUBLICATIONS

Wüsteney et al.("Impact of Packet Filtering on Time-Sensitive Networking Traffic", 2021 17th IEEE International Conference on Factory Communication Systems (WFCS) pp. 59-66) (Year: 2021).*
(Continued)

*Primary Examiner* — Michael M Lee
(74) *Attorney, Agent, or Firm* — Harness, Dickey & Pierce, P.L.C.; Anthony G. Fussner

(57) ABSTRACT

The invention relates to a method for allowing data packets in a network to arrive at the recipient at definable times. The method requires a firewall in a computer network. Each data packet which is transmitted through the firewall to a recipient is assigned a time budget for processing in the firewall. After the time budget has expired, the firewall performs a firewall action for each data packet, which can be executed as sending to the recipient or discarding the packet. The time budget may be less than the processing time required by the firewall to completely process all filter rules, and thus forms a termination condition for processing the data packet in the firewall.

15 Claims, 4 Drawing Sheets

(56) References Cited

U.S. PATENT DOCUMENTS

| | | | | |
|---|---|---|---|---|
| 2006/0265748 | A1* | 11/2006 | Potok | H04L 63/1425 726/25 |
| 2011/0035469 | A1* | 2/2011 | Smith | H04L 61/4511 709/225 |
| 2012/0140630 | A1 | 6/2012 | McGrath et al. | |
| 2017/0111295 | A1 | 4/2017 | Snowdon et al. | |
| 2019/0386960 | A1* | 12/2019 | Huang | H04L 63/0263 |
| 2020/0195611 | A1* | 6/2020 | Cook | H04L 41/0894 |

OTHER PUBLICATIONS

International Search Report (and its English translation) and Written Opinion for PCT/EP2023/054098 that is the parent application to the instant application; dated Apr. 28, 2023; 11 pages.

* cited by examiner

CONDITIONAL FILTERING FOR TIME-DETERMINISTIC FIREWALL

This patent application is a U.S. national stage filing under 35 U.S.C. § 371 of PCT International Application No. PCT/EP2023/054098 filed Feb. 17, 2023 (published as WO2023/156626 on Aug. 24, 2023), which claims priority to and the benefit of German Application No. 10 2022 103 927.7 filed Feb. 18, 2022. The entire contents of these applications are incorporated herein by reference.

The present invention relates to a method for realizing conditional filtering for time-deterministic firewalls.

Firewalls are needed in computer networks for filtering the data packets sent in the network and for forwarding or discarding them according to rules.

Packet filters (firewall or switch with ACL rules) examine packets and decide based upon a set of rules. This set of rules can be saved in the firewall.

The increased volume of real-time traffic means that firewalls must also be able to process packets in real time (i.e., with a specified delay or processing time). The available time budget may be too small for the complete analysis of the packet with regard to all firewall rules. This can depend upon the load on the firewall (e.g., firewall takes too long because other calculations were processed with priority) or upon parallel processes on the firewall (CPU is being used for something else).

Today, firewalls have no time budgets. As a result, firewalls can forward packets with too much delay/latency, and time-critical packets can therefore arrive too late at the recipient in the network. Likewise, greatly varying processing times cause problems, since they can lead to bursts of package processing and a backlog of packages. A constant processing time is therefore advantageous in many cases, especially for the accurate prediction and planning of packet flows in the network.

So far, this problem has not been examined in depth in the research, because firewalls have not been used in conjunction with time-critical traffic. This invention describes a method for dealing with this situation.

The object of the present invention is therefore to implement a method for ensuring that time-critical packets arrive at the recipient in good time. Accordingly, the invention sets itself the object of demonstrating a method for conditional filtering for time-deterministic firewalls.

This object is achieved by the features of the main claim.

For this purpose, a method is proposed which ensures that data packets in a network arrive at the recipient at specified times. The aim of the method is to be able to predict the time it takes for a data packet from the sender to reach the destination, in order to be able to control and predict data traffic in the network using these defined times.

In order to achieve a constant processing time of a packet through a firewall, it may be useful to terminate the analysis of a packet after a fixed time $t_{max}$ and to send the packet through the firewall without a complete evaluation.

We assume the complete processing time to be $t_{process}$. Normally, after arriving at time to, the packet would be sent at time $t_0+t_{process}$. The time duration $t_{process}$ can be variable, since it depends upon the processing time of the firewall and the number of filter rules. A rule set of a firewall usually consists of several (many) rules. In order to achieve a constant processing time, a mechanism is proposed which limits this: When the maximum processing time $t_{max}$ is reached, the processing of the rules is interrupted, and a predetermined result is assumed. The packet is sent at time $t_0+t_{max}$ (which may be less than $t_0+t_{process}$). Alternatively, the check can be terminated by discarding the packet after this fixed time. This ensures that subsequent packets only have to wait a defined time.

Forwarding or discarding the packet is defined as a firewall action in the firewall rule set. Firewall actions can be common firewall actions such as Accept, Drop, Reject, and/or Log. These actions can also be combined.

In case of forwarding the packet, the packet is forwarded without complete filtering after the maximum processing time $t_{max}$. This is useful for packets where the timely delivery is more important than the complete evaluation of all firewall rules. Discarding the packet after $t_{max}$ is useful for low-priority packets, in order to avoid spending too much processing time on these less important packets, which in turn could delay high-priority packets.

The decision about which firewall action to apply (discard or forward) can either be configured for traffic classes, or be determined based upon the packet using the matching rules of the firewall. This allows different actions to be defined for different packages based upon the package characteristics. This corresponds to the normal function of a firewall.

In addition, the maximum processing time $t_{max}$ can be configured based upon the traffic class, or any matching rules can be used to define $t_{max}$. For this purpose, new rules can be introduced in the firewall which contain a reassignment of a processing strategy (forward or delete) and/or a time budget $t_{max}$ as the decision.

Since, when sending a packet according to this method, a packet is forwarded after incomplete checking at time $t_0+t_{max}$, a security problem may arise (send upon decision). Likewise, important low-priority packets may be lost (discarded upon decision).

To address these problems, we additionally provide for not only sending and discarding incompletely processed packets at time $t_0+t_{max}$, but also for keeping a copy of the packet in a buffer memory, in order to fully analyze this copy later as soon as the firewall has enough performance reserves to process the remaining rules. For this purpose, unfinished, terminated packets are copied into a buffer memory and fed back into filtering when processing capacity becomes available. In this second, later, filtering step, only the rules that have not yet been applied need to be considered. Therefore, when the filtering of a packet is terminated, the rule position at which the filtering was interrupted and how the packet was handled are also buffered (forwarding or deletion).

In the second (later) filter pass, it can be determined for the buffered packets that forwarding or deletion was incorrect. In case of false forwarding, another system can then be informed (e.g., an attack detection system), or an explicit deletion rule for subsequent traffic can be inserted into the firewall. This additional rule is inserted at the beginning of the rule list of the firewall to make processing this rule more likely. In case of false deletion, the buffered copy of the packet can be retransmitted after complete filtering.

Since the buffer is limited for packets to be analyzed later, the buffer can be configured to buffer packets only for a certain period of time. They can then be deleted or sent. The buffer can also be configured such that, if there is not enough space in the buffer, either old or newly arriving packets are discarded.

The buffering and/or the second filtering pass can also be performed on an external network device.

The described method achieves two things: a) it achieves a guaranteed processing time for packets regardless of the load on the firewall. B) it contributes to load smoothing, since packets can be reprocessed during times of lower load.

Further features are apparent from the accompanying figures. In the drawings.

Figure 1:
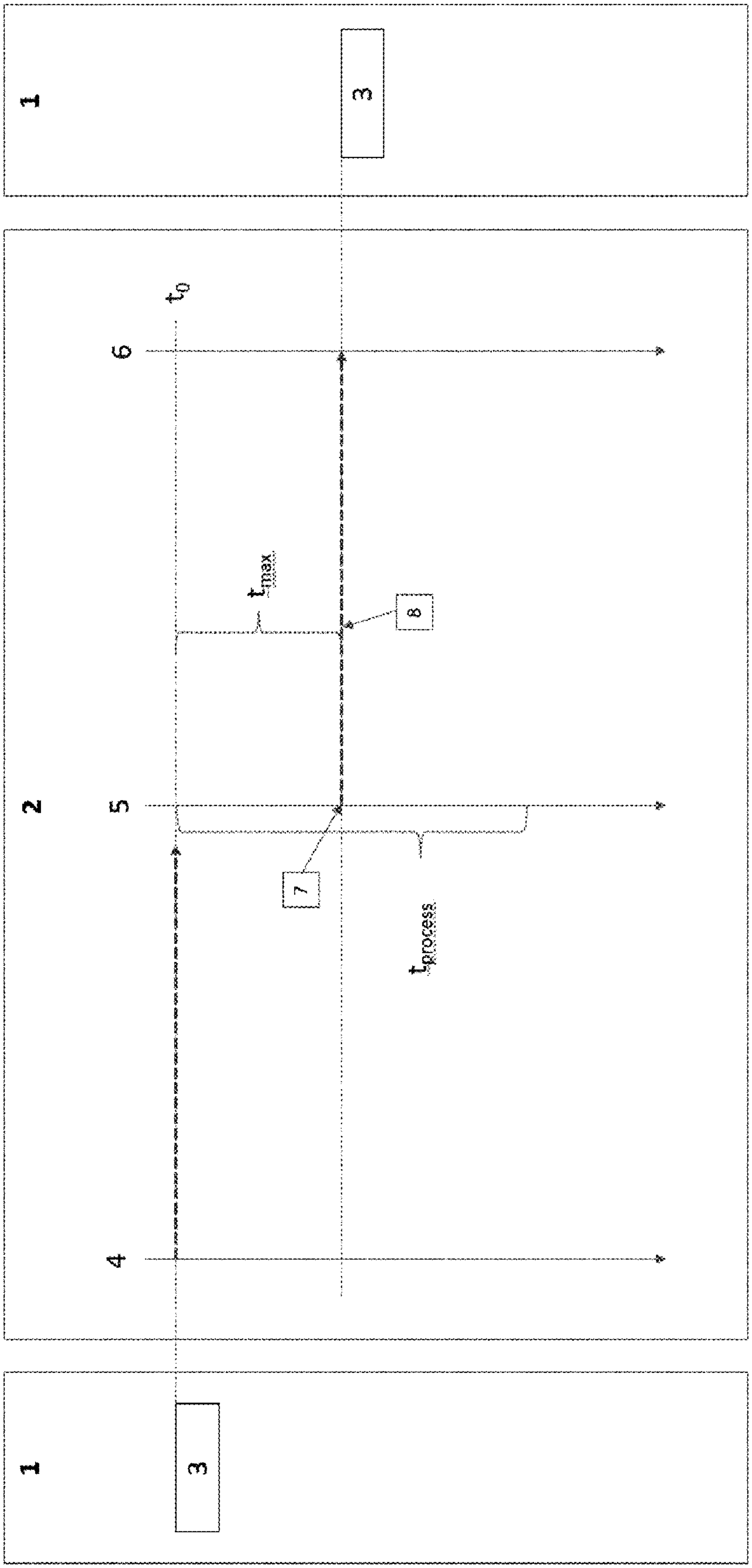
FIG. 1 shows a time diagram for packet filtering with a termination criterion.

FIG. 1 shows a time diagram of the method according to the invention. Here, a data packet 3 in a network 1 is fed to a firewall 2 in order to be examined according to the rules saved in the firewall 2. The arrival time of the data packet is described by $t_0$.

Depending upon the number of rules to be processed, the performance of the firewall 2, and the amount of work for the firewall 2 when the data packet arrives at the input 4 of the firewall, the data packet requires a processing time $t_{process}$.

However, there are situations in which a fast forwarding of a data packet is more important than the complete processing of all filter rules in the firewall 2.

In order to achieve time-deterministic behavior, it is now introduced that data packet 3 can be sent according to a predefined termination criterion, even if the filtering in the firewall 2 has not yet been completed at this time. As a termination criterion, a predetermined time $t_{max}$ is defined in FIG. 1, which is the maximum waiting time required for filtering a data packet 3 in the firewall 2. If this time has expired, the filtering is terminated 7, and the data packet is forwarded 8.

After the time $t_{max}$ has elapsed, the data packet 3 is sent to the output 7 of the firewall 3 and thereby forwarded to the network 1.

For this purpose, it is helpful if data packet 3 is accordingly marked so that it can also be seen later that, for this data packet 3, complete filtering by firewall 2 was not performed.

Figure 2:
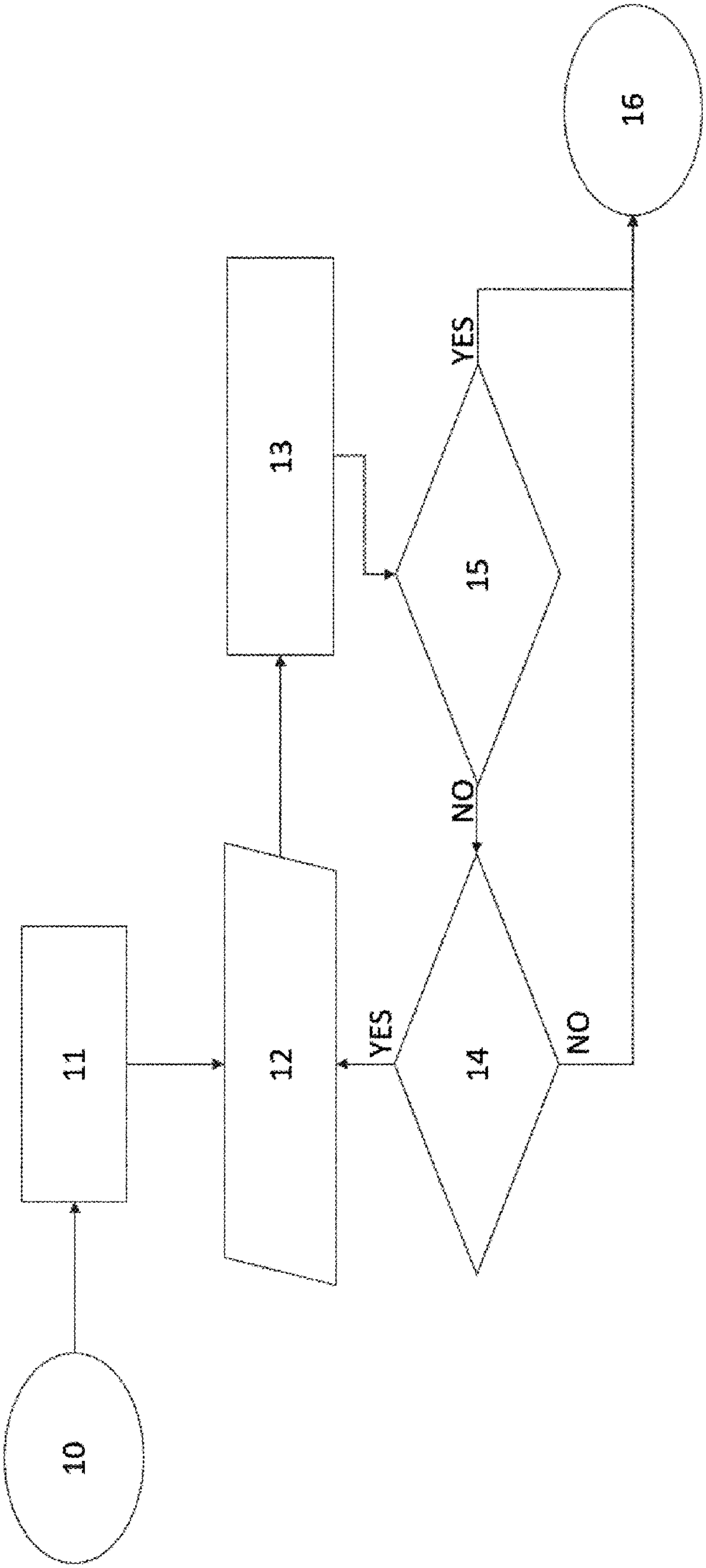
FIG. 2 shows a block diagram for FIG. 1.

FIG. 2 illustrates the method of FIG. 1 as a block diagram. First, a data packet or a data frame is received by the firewall 10. In this case, a timestamp is created, or the time of receipt is determined upon arrival 11 at the firewall in a functionally equivalent manner. Afterwards, the filtering 12 by the firewall begins.

After a filter rule has been processed, the time that has passed since the arrival time 11 is recorded. This elapsed time is then checked as to whether it already corresponds to a predefined maximum filtering time. If this time is reached, the termination criterion 15 is met. In this case, the data packet is routed to the output of the firewall and therefore sent 16, even though not all filter rules have been processed yet.

Instead of sending 16 data packets, a firewall action can also be performed. This can include forwarding or discarding the data packet (3).

If the termination criterion 15 has not yet been reached, it is queried 14 as to whether further rules should be implemented by the filtering in the firewall. If this is the case, the data packet is subjected to further filtering 12.

If no further filter rules need to be processed, the data packet can also be forwarded for sending 16. In time-deterministic networks, a data packet arriving earlier is not critical, while a data packet arriving late at the recipient should be avoided.

Figure 3:
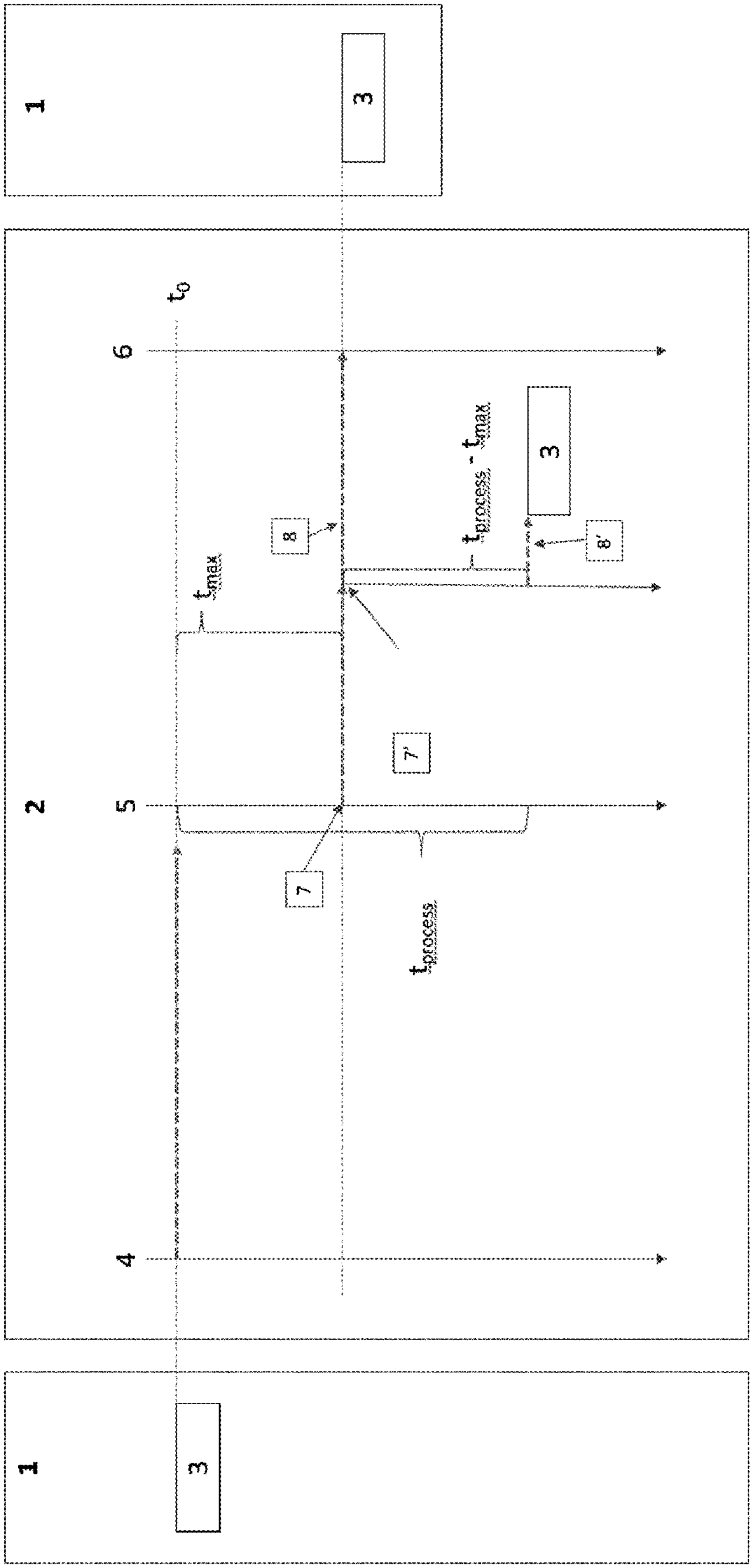
FIG. 3 shows a timing diagram for packet filtering with downstream filtering.

FIG. 3 shows the inventive method according to FIG. 1 as a time diagram, wherein a buffering of data packets is now provided, as well as post-processing of the data packet. Here, a data packet 3 in a network 1 is fed to a firewall 2 in order to be examined according to the rules saved in the firewall 2. The arrival time of the data packet is described by to.

Depending upon the number of rules to be processed, the performance of the firewall, and the arising workload of the firewall upon the arrival of the data packet at the input 4 of the firewall, the data packet requires a processing time $t_{process}$.

However, there are situations in which a rapid forwarding of a data packet is more important than the complete processing of all filter rules in the firewall 2.

In order to achieve time-deterministic behavior, it is now introduced that data packet 3 can be sent according to a predefined termination criterion, even if the filtering in the firewall 2 has not yet been completed at this time. As a termination criterion, a predetermined time $t_{max}$ is defined in FIG. 1, which is the maximum waiting time required for filtering a data packet 3 in the firewall 2. If this time has expired, the filtering is terminated 7, and the data packet is forwarded 8.

After the time $t_{max}$ has elapsed, the data packet 3 is sent to the output 7 of the firewall 3 and therefore forwarded to the network 1.

For this purpose, it is helpful if data packet 3 is accordingly marked so that it can also be seen later that, for this data packet 3, complete filtering by firewall 2 was not performed.

Unlike in FIG. 2, the data packet 3 is fed to a buffer. This buffer can be integrated into the firewall 2, but another network participant can also be provided for this purpose.

If the network participant can spare the necessary resources by use of the buffer, the previously terminated filtering is then continued 7'. This further rule processing can then be carried out by the firewall 2 itself or by the network participants by use of the buffer.

For this purpose, it is proposed not only to mark the data packet in the buffer as one for which filtering was terminated, but also which filter rules still need to be processed until filtering is complete.

The time that is required for this further filtering must be calculated. It is determined from the defined maximum processing time after which the processing of firewall 2 was initially terminated and the processing time for post-processing. The difference between the two times is then the processing time for post-processing.

Once the post-processing is complete, a firewall action can be initiated. This can mean reforwarding 8' the data packet or discarding the data packet.

Figure 4:
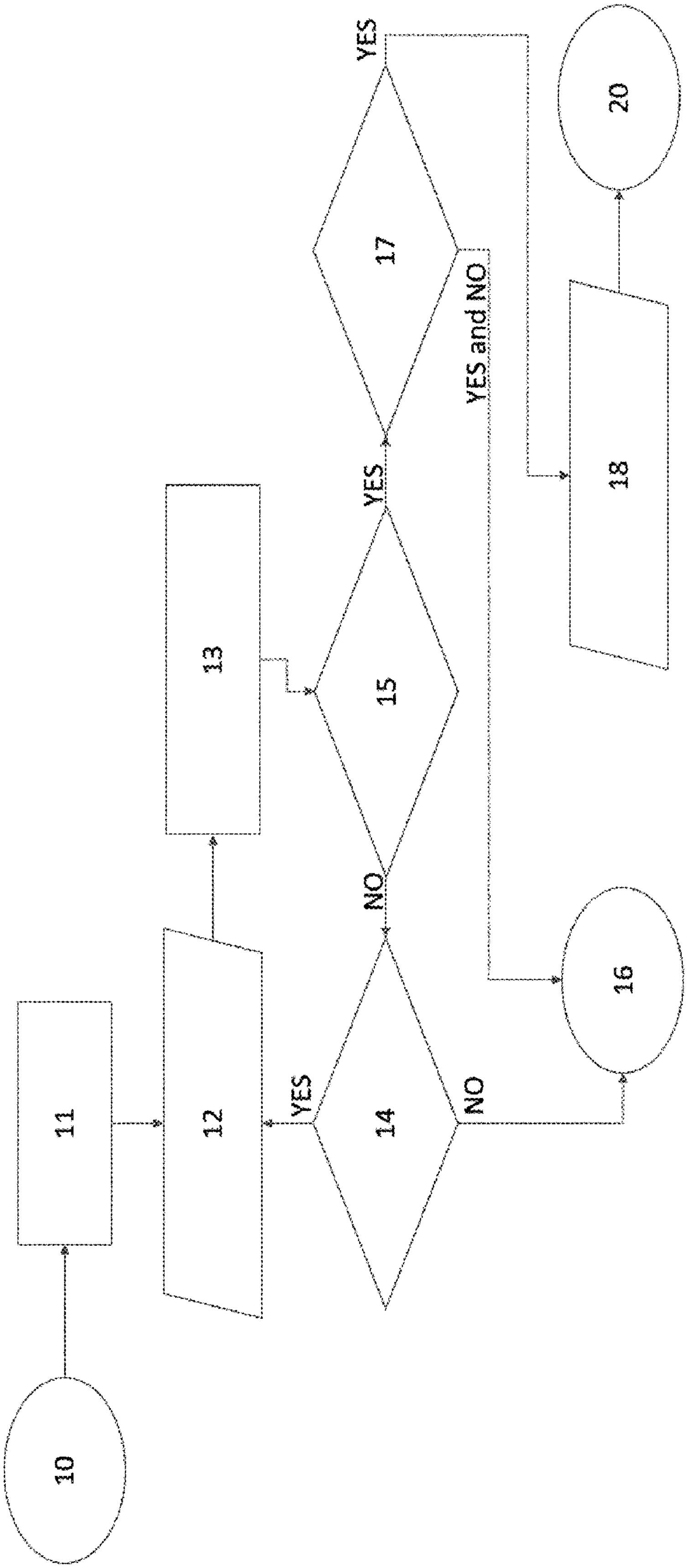
FIG. 4 shows a block diagram for FIG. 3.

FIG. 4 illustrates the method according to FIG. 3 as a block diagram. First, a data packet or a data frame is received by the firewall 10. In this case, a timestamp is created, or the time of receipt is determined upon arrival 11 at the firewall in a functionally equivalent manner. Afterwards, the filtering 12 by the firewall begins.

After a filter rule has been processed, the time that has passed since the arrival time 11 is recorded. This elapsed time is then checked as to whether it already corresponds to a predefined maximum filtering time. If this time is reached, the termination criterion 15 is met. In this case, the data packet is routed to the output of the firewall and therefore sent 16, even though not all filter rules have been processed yet.

Instead of sending 16 data packets, a firewall action can also be performed. This can include forwarding or discarding the data packet (3).

If the query 17 shows that not all rules have been processed, the data packet is also transferred to a buffer.

If the termination criterion 15 has not yet been reached, it is queried 14 as to whether further rules shall be implemented by the filtering in the firewall. If this is the case, the data packet is subjected to further filtering 12.

If no further filter rules need to be processed, the data packet can also be forwarded for sending 16. In time-deterministic networks, a data packet arriving earlier is not critical, while a data packet arriving late at the recipient should be avoided.

If a data packet has been marked for later post-processing, and/or the data packet has been stored in the buffer for subsequent processing 18, this subsequent processing 18 takes place at a later point in time when the network participant can spare resources for it.

The filtering is continued at the point at which the termination criterion caused a termination of the processing in the firewall. After the conclusion of filtering, the data packet is then subjected to a firewall action 20 and is thereby forwarded or discarded.

LIST OF REFERENCE SIGNS

1 Network
2 Firewall
3 Data packet
4 Input
5 Processing
6 Output
7 Terminate rule processing
7 Continue rule processing
8 Forwarding
8' Reforwarding
10 Receipt
11 Arrival time
12 Processing
13 Determine processing time
14 Query for further rules
15 Termination criteria
16 Send
17 Query for further rules
18 Subsequent processing
20 Firewall action

The invention claimed is:

1. A method for allowing data packets in a network to arrive at a recipient at specified times, the method performed with a firewall in a computer network, the firewall containing filter rules, the method comprising:

upon receipt at an input of the firewall of a data packet addressed to the recipient, recording an arrival time for the data packet;

assigning to the data packet a time budget for processing of the data packet in the firewall;

applying the filter rules to the data packet until either (i) all of the filter rules applicable to the data packet are processed or (ii) expiration of the time budget; and upon expiration of the time budget before completion of processing of the filter rules:

performing a predefined firewall action for the data packet, the predefined firewall action comprising forwarding the data packet to an output of the firewall or discarding the data packet; and marking the data packet and/or a stored copy of the data packet with metadata indicating an index of a last-processed rule.

2. The method according to claim 1, wherein a processing time of the firewall comprises a time from the input of the data packet at the firewall, over processing by the firewall, to the output of the data packet at the firewall.

3. The method according to claim 1, wherein the time budget for processing the data packet in the firewall corresponds to a definable maximum time that is less than a time required by the firewall to process all of the filter rules applicable to the data packet.

4. The method according to claim 3, wherein forwarding the data packet to the output of the firewall is performed as the predefined firewall action according to a termination criterion.

5. The method according to claim 4, wherein discarding the data packet is performed as the predefined firewall action according to the termination criterion.

6. The method according to claim 4, wherein the expiration of the defined maximum time is defined as the termination criterion.

7. The method according to claim 1, wherein, in the event that the processing of the filter rules in the firewall has not yet been completed after expiration of the time budget, the corresponding data packet is marked and provided with additional information.

8. The method according to claim 7, wherein the additional information comprises an identification of outstanding filter rules which have not yet been processed by the firewall for the data packet.

9. The method according to claim 1, wherein, in the event that the processing of the filter rules in the firewall has not yet been completed after expiration of the time budget, the method includes saving a copy of the data packet together with the metadata in a buffer.

10. The method according to claim 9, wherein the buffer is arranged in a network participant outside the firewall.

11. The method according to 9, further comprising post-processing, after the predefined firewall action, the copy of the data packet from the buffer to complete processing of the outstanding filter rules of the firewall, starting at the index of the last-processed rule.

12. The method according to claim 11, wherein, after completion of the processing of the outstanding filter rules, the method includes performing a further firewall action comprising at least one of: (i) notifying an intrusion or attack detection system of a false forwarding; (ii) inserting into the firewall a new explicit rule to block subsequent traffic matching the data packet; or (iii) retransmitting the buffered copy if a false discarding is determined.

13. The method according to claim 1, wherein upon arrival at the input of the firewall, the recording an arrival time for the data packet includes a timestamp stored in association with the data packet.

14. The method according to claim 1, wherein a processing time corresponds to the time required by the firewall for filtering the data packet.

15. The method according to claim 1, wherein subsequent processing of the filter rules for the data packet in a buffer is carried out by a network participant outside the firewall.

* * * * *